United States Patent
Awan et al.

(10) Patent No.: US 11,247,715 B2
(45) Date of Patent: Feb. 15, 2022

(54) STEER-BY-WIRE SYSTEM, MOTOR VEHICLE, AND METHOD FOR OPERATING A STEER-BY-WIRE SYSTEM

(71) Applicants: Ford Global Technologies, LLC, Dearborn, MI (US); ThyssenKrupp Presta Aktiengesellschaft, Eschen (LI)

(72) Inventors: Muhammad Adeel Awan, Herzogenrath (DE); Jens Dornhege, Pulheim (DE); Goetz-Philipp Wegner, Dortmund (DE); Otto Hofmann, Erftstadt (DE); Frank Peter Engels, Solingen (DE); Kristof Polmans, Tarrenz (AT)

(73) Assignees: Ford Global Technologies, LLC, Dearborn, MI (US); ThyssenKrupp Presta Aktiengesellschaft, Eschen (LI)

( * ) Notice: Subject to any disclaimer, the term of this patent is extended or adjusted under 35 U.S.C. 154(b) by 69 days.

(21) Appl. No.: 16/099,199

(22) PCT Filed: May 12, 2017

(86) PCT No.: PCT/EP2017/061484
§ 371 (c)(1),
(2) Date: Nov. 6, 2018

(87) PCT Pub. No.: WO2017/198565
PCT Pub. Date: Nov. 23, 2017

(65) Prior Publication Data
US 2019/0152513 A1    May 23, 2019

(30) Foreign Application Priority Data
May 20, 2016    (DE) ................... 10 2016 208 775.4

(51) Int. Cl.
*B62D 5/00* (2006.01)
*B62D 5/04* (2006.01)
(Continued)

(52) U.S. Cl.
CPC ........... *B62D 5/003* (2013.01); *B62D 5/0418* (2013.01); *B62D 5/0484* (2013.01); *B62D 7/159* (2013.01); *B62D 9/005* (2013.01)

(58) Field of Classification Search
CPC .... B62D 5/003; B62D 5/1418; B62D 5/1484; B62D 9/005; B62D 7/00; B62D 7/148;
(Continued)

(56) References Cited

U.S. PATENT DOCUMENTS

| 6,991,061 B2 | 1/2006 | Laurent |
| 7,912,606 B2 | 3/2011 | Auguet |

(Continued)

FOREIGN PATENT DOCUMENTS

| DE | 60315116 T2 | 4/2008 |
| EP | 1268257 B1 | 7/2006 |

(Continued)

OTHER PUBLICATIONS

International application No. PCT/EP2017/061484, International Search Report, dated Aug. 18, 2017.
(Continued)

*Primary Examiner* — Anthony R Jimenez
(74) *Attorney, Agent, or Firm* — Cahn & Samuels, LLP

(57) ABSTRACT

A steer-by-wire system for a motor vehicle includes at least two wheels which are steerable independently of one another in a normal operating mode of the steer-by-wire system, at least two steering actuators, each one being assigned to one of the steerable wheels and being configured for adjusting a steering angle of the particular steerable wheel, and at least one steering electronics system which is
(Continued)

signally connected to the steering actuators and which is configured for controlling the steering actuators individually on the basis of steering commands.

16 Claims, 1 Drawing Sheet

(51) Int. Cl.
*B62D 7/15* (2006.01)
*B62D 9/00* (2006.01)

(58) Field of Classification Search
CPC .......... B62D 7/1581; B62D 3/00; B62D 3/02; B62D 3/12; B62D 3/14; B62D 5/00; B62D 5/005; B62D 5/02; B62D 5/008; B62D 5/30; B62D 5/0484; B62D 5/04; B62D 5/0409; B62D 5/0481; B62D 6/00; B60R 25/021; B60W 10/20; B60W 30/06; B60W 2510/00; B60W 2510/10; B60W 2510/20; B60W 2510/202; B60W 2510/205; B60W 2510/207; B60W 2540/00; B60W 2540/18; B60W 2710/00; B60W 2710/20; B60W 2710/202; B60W 2710/205; B60W 2710/207

USPC .......................................................... 701/43
See application file for complete search history.

(56) References Cited

U.S. PATENT DOCUMENTS

| 2004/0140147 | A1 | 7/2004 | Laurent |
| 2016/0200349 | A1* | 7/2016 | Whitaker, Jr. ........... B62D 5/30 |
| | | | 180/421 |
| 2017/0267275 | A1 | 9/2017 | Engels et al. |

FOREIGN PATENT DOCUMENTS

| JP | 2006151073 A | 6/2006 |
| WO | 2004071848 A1 | 8/2004 |
| WO | 2005012063 A1 | 2/2005 |

OTHER PUBLICATIONS

English Abstract of WO 2005012063, Feb. 10, 2005.
English Abstract of WO 2004071848, Aug. 26, 2004.
English Abstract of EP 1268257, Jul. 26, 2006.
English Abstract of JP 2006151073, Jun. 15, 2006.
English Abstract of DE 60315116, Apr. 10, 2008.

* cited by examiner

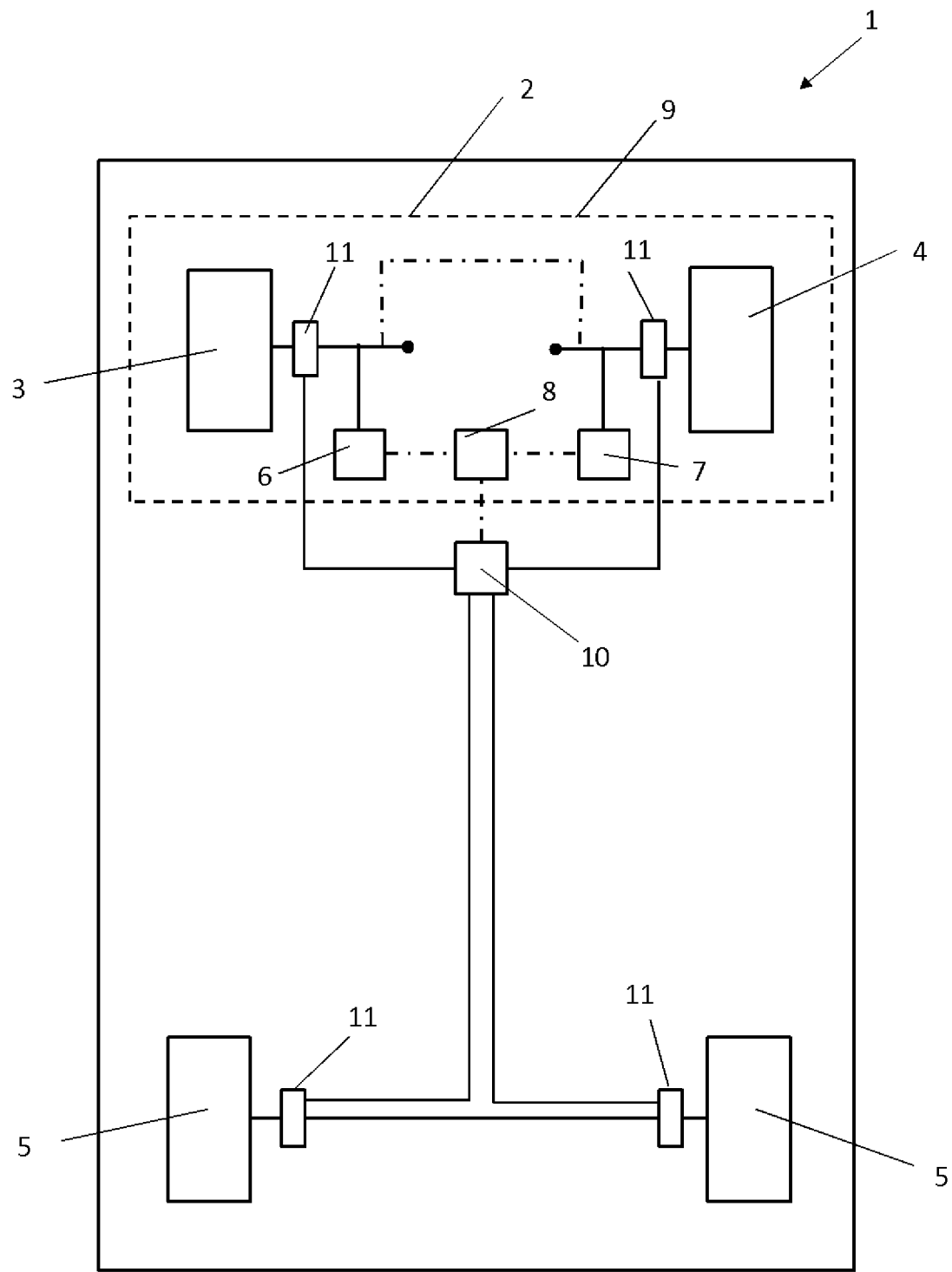

STEER-BY-WIRE SYSTEM, MOTOR VEHICLE, AND METHOD FOR OPERATING A STEER-BY-WIRE SYSTEM

This application is a U.S. national stage application of PCT/EP2017/061484 filed on 12 May 2017 and claims priority to German patent document 10 2016 208 775.4 filed on 20 May 2016, the entireties of which are incorporated herein by reference.

BACKGROUND OF INVENTION

The invention relates to a steer-by-wire system for a motor vehicle, comprising at least two wheels which are steerable independently of one another in a normal operating mode of the steer-by-wire system, at least two steering actuators, each one being assigned to one of the steerable wheels and being configured for adjusting a steering angle of the particular steerable wheel, and at least one steering electronics system which is signally connected to the steering actuators and which is configured for controlling the steering actuators individually on the basis of steering commands.

The invention also relates to a motor vehicle and to a method for operating a steer-by-wire system of a motor vehicle, wherein the steer-by-wire system comprises at least two wheels which are steerable independently of one another in a normal operating mode of the steer-by-wire system, and at least two steering actuators, each one being assigned to one of the steerable wheels and being configured for adjusting a steering angle of the particular steerable wheel.

A conventional steering system of a motor vehicle can be mechanically designed and can comprise an auxiliary assembly for carrying out steering assistance. In such a steering system, a steerable wheel of a wheel axle of one track is directly mechanically connected to the steerable wheel of the wheel axle of the other track. In addition, a steering wheel of the steering system is directly mechanically connected to the steerable wheels, in particular via an intermediate shaft, a steering column, and a steering gearbox. In such a steering system, the motor vehicle is steerable even if the auxiliary assembly fails, due to the mechanical connection of the components of the steering system, but a greater force must be applied to the steering wheel by a driver for this purpose.

In addition, steer-by-wire systems for motor vehicles are known, in which the steering wheel is not mechanically connected to the steerable wheels via steering system components. In a steer-by-wire system as well, the steerable wheels of one wheel axle can be directly mechanically connected to each other via a steering linkage. A steer-by-wire system has the advantage over the above-described conventional steering system that a behavior of the motor vehicle in the event of an accident is improved, since a steering column is not present, which could become displaced in the direction of a driver in the event of an accident. A risk of injury to the driver is reduced as a result. A steer-by-wire system also makes it possible to displace the steering wheel from a driver position to a front-passenger position in the event of an accident, in order to reduce the risk of injury to the driver.

In a special version of a steer-by-wire system, assigned to each steerable wheel of a motor vehicle is a separate steering actuator, by means of which a steering angle of the particular steerable wheel can be individually adjusted independently of the remaining steerable wheels, whereby individual wheel steering can be implemented. One advantage of such a steer-by-wire system, for example, is that the steering of the motor vehicle can be implemented according to the Ackermann principle in all driving situations, which, due to the resultant reduction in friction between the wheels and the road, is associated with a reduction in carbon dioxide emissions of the motor vehicle, reduced wheel wear, an increase in grip during cornering, and the like. Since the individual steering actuators can be disposed at different positions on the motor vehicle, the advantage, inter alia, over conventional steering systems described above is that an overhang at the front of a motor vehicle can be reduced, which increases the freedom in designing the motor vehicle.

DE 603 15 116 T2 discloses a steer-by-wire system according to the preamble of main claim, in which in case of failure of a steering actuator dynamically a compensating steering angle is calculated for a remaining functional steering actuator.

Also according to U.S. Pat. No. 7,912,606 B2 a dynamic steering angle calculation is performed upon detection of a faulty steering actuator, in particular dependent on the position of the center of rotation of the vehicle.

The problem addressed by the invention is that of increasing the driving safety of a motor vehicle which comprises a steer-by-wire system for individually steering steerable wheels.

This problem is solved by the independent claims. Advantageous embodiments are described, in particular, in the dependent claims which can depict a refining or advantageous aspect of the invention individually or in various combinations with one another.

SUMMARY OF INVENTION

A steer-by-wire system for a motor vehicle according to the invention comprises at least two wheels which are steerable independently of one another in a normal operating mode of the steer-by-wire system, at least two steering actuators, each one being assigned to one of the steerable wheels and being configured for adjusting a steering angle of the particular steerable wheel, and at least one steering electronics system which is signally connected to the steering actuators and which is configured for controlling the steering actuators individually on the basis of steering commands. According to the invention, the steering electronics system is configured for detecting whether one of the steering actuators has failed and, upon detection of a failure of a steering actuator characterizing an emergency operating mode of the steer-by-wire system, controls the at least one further steering actuator with a steering ratio having a directness which deviates from a directness of a steering ratio in the normal operating mode.

Due to the deviation of the steering ratio in the emergency operating mode of the steer-by-wire system according to the invention from the steering ratio during the normal operation of the steer-by-wire system, a steering command which a driver of the motor vehicle generates by actuating the steering wheel of the motor vehicle can be transmitted during the emergency operating mode more directly or indirectly, as necessary, to the at least one steerable wheel having the steering actuator that has not failed. This is necessary, since the steerable wheel having the failed steering actuator can no longer be used for carrying out a steering maneuver. The steering maneuver must therefore be carried out by means of the at least one steerable wheel having the steering actuator that has not failed, which means that a greater steering angle is required, for example, during cornering, for the steerable wheel having the steering actuator that has not failed. In order to assist the driver in such a situation, the steering ratio is increased, and therefore a movement of the steering wheel results in a greater turning-in of the wheel that is still steerable. As a result, the situation in which the driver loses control of the vehicle can be prevented. The driving safety or controllability of the motor vehicle in the event of a failure of a steering actuator is therefore improved.

Preferably, the transmission ratio between the introduced steering angle and the steering angle on the at least one remaining available driving wheel is varied as a function of the driving speed and the steering angle present immediately before the onset of emergency operation. Preferably, the translation at lower speeds is more direct, i.e. at a defined steering angle introduced into the steering wheel, the driving wheel steering angle is greater than at high speeds. Further at large steering angles introduced immediately before the emergency operation, the translation is also greater than at low steering angles.

The following formula can be used to express the ratio:

$$UE = a \cdot \frac{1}{v_0 + v} + b \cdot \sin(|LE|) \tag{1}$$

whereby:
UE Translation
v: Vehicle speed
$v_0$: Initial value (e.g., 10 km/h)
LE: Drive wheel steering angle
a, b: Coefficients, to be determined experimentally.

Preferably, the coefficients a, b are determined additionally depending on whether it is possible to brake or release the failure affected steering actuator in its pivoting.

For realization within the motor vehicle, it is preferably possible to determine the preferred gear ratio for several vehicle speeds, for example 30, 50, 80, 110 km/h, and in each case for several steering angles, for example 0°, 10° to the right, 10° to the left and possibly also 20° to the right and also 20° to the left, and to use an interpolation formula between the values. The preferred transmission ratio is determined by the fact that from the steering mechanism of the operating wheel or the functioning wheels, the lowest adjustment torque or the lowest adjustment force must be used to keep the previously set cam track of the vehicle with a deviation of less than 15%, if the steering angle induced by the driver remains constant.

The steering angle of the steerable wheel having the steering actuator that has not failed, or the steering ratio present in the emergency operating mode of the steer-by-wire system is selected in such a way that the motor vehicle deviates as little as possible from a direction of travel selected before the steering actuator failed. As a result, the steering ratio is preferably selected during the emergency operation in such a way that the steering angle required for carrying out a driving maneuver which was planned before the steering actuator failed does not need to be changed, or must only be changed very slightly, when the motor vehicle is still being steered by the steerable wheel having the steering actuator that has not failed.

In contrast thereto, in a conventional steering system, it is possible that the driver will not respond quickly enough when surprised by the failure of a steering actuator and, as a result, will not steer the motor vehicle with a steering wheel angle which is required for carrying out such a driving maneuver, in particular a greater steering wheel angle. As a result, it is possible that the motor vehicle will at least briefly undergo a lateral movement and, as a result, will unintentionally leave a lane. This poses an increased collision risk. Such an increase in the collision risk can be reliably prevented via the invention, since the steer-by-wire system switches from the normal operating mode into the emergency operating mode when a failure of a steering actuator occurs and, as a result, the steering ratio is changed in such a way that the amount of steering effort required by the driver does not increase or almost does not increase. The driver can therefore steer the motor vehicle with the amount of steering effort he is accustomed to, which increases the driving safety.

According to the invention, no additional, redundant steering system components, such as, for example, an additional steering actuator, an additional electronics system, an additional torque sensor, and the like, are required in order to ensure safe driving of the motor vehicle in the event of a failure of the steering actuator. There is also no need to redevelop the on-board electrical system and communication interfaces with the steering system of the motor vehicle in order to ensure uninterrupted availability of a redundant on-board electrical system and redundant communication interfaces. Consequently, the invention can be implemented cost-effectively by using mechanical components which are already available.

The steering actuators can each comprise, for example, an electrical servomotor, by means of which the steering angle of the particular steerable wheel can be adjusted. The steering actuators can be connected to each other and/or to a feedback actuator of the steer-by-wire system for communication purposes. The feedback actuator is connected to the steering wheel and, on the basis of steering commands from the driver, can generate electrical steering command signals which are fed to the steering electronics system. Alternatively, another sensor for generating the steering command signals can be present. In addition, by means of the feedback actuator, the driver can be provided with a realistic steering response by way of the feedback actuator applying forces onto the steering wheel, which correspond to load forces acting on the vehicle, with or without damping, and which can be sensed via a vehicle sensor system.

The steer-by-wire system according to the invention can be used for steering steerable front wheels of a motor vehicle. The steer-by-wire system according to the invention can also be used for steering steerable front wheels and steerable rear wheels of the motor vehicle, for the purpose of which the steer-by-wire system comprises a separate or dedicated steering actuator for each steerable wheel. If a steering actuator fails, then, according to the invention, the remaining steering actuators can be controlled in order to improve the controllability of the motor vehicle.

In the normal operating mode of the steer-by-wire system, the steerable wheels can be steered independently of one another or individually, whereby individual wheel steering is implemented in the normal operating mode.

The steering electronics, which are signally connected to the steering actuators, can be designed in the form of software implemented in an available vehicle electronics system or can be designed as a separate assembly. Steering commands which are generated, for example, by a sensor system which senses steering movements of the steering wheel are fed to the steering electronics in electrical form. In addition, in the event of a failure of a steering actuator, an electrical failure signal which is specific for the particular steering actuator can be fed to the steering electronics. This individualized failure signal can be generated, for example, by the failed steering actuator, by a sensor system disposed thereon, or in another way. If the steering electronics receive or detect such an individualized failure signal, the steering electronics automatically switch from the normal operating mode into the emergency operating mode. In this case, the steering electronics can select a certain steering ratio from one or multiple steering ratios and use said steering ratio for controlling the at least one steering actuator that has not failed. In particular, a certain steering ratio for each failure scenario can be stored in the steering electronics system or in a memory unit contained therein, which can be selected by the steering electronics system or a data processing unit contained therein, depending on the particular steering actuator which has failed. By using the steering ratio selected in the emergency operating mode and the electrical steering commands forming the input signals for the steering electronics system, the steering electronics system generates electrical output signals or electrical control signals which are fed to the steering actuator that has not failed.

Within the scope of the invention, a greater directness of a steering ratio means that a certain steering wheel angle of the steering wheel results in a setting of a greater steering angle of the steerable wheel having the steering actuator that has not failed, while a reduced directness of a steering ratio correspondingly results in a smaller steering angle of the steerable wheel having the steering actuator that has not failed.

According to one advantageous embodiment, the steering electronics system is configured in such a way that, upon detection of the failure of the steering actuator, said system controls the at least one further steering actuator with a more direct steering ratio than in the normal operating mode. As a result, the motor vehicle can be controlled by the driver during cornering, in particular, in the same way as when driving with steering actuators that have not failed, since the steerable wheel having the steering actuator that has not failed is turned in to a greater extent and, therefore, additionally takes over the effect of the steerable wheel having the failed steering actuator.

According to yet another advantageous embodiment, at least one steering actuator is designed in such a way that said actuator, in the event of the failure thereof, blocks a steering movement of the steerable wheel assigned thereto. The situation is thereby prevented in which the instantaneous steering angle of the steerable wheel assigned to the failed steering actuator changes in an uncontrolled manner or varies over time, which would substantially worsen the controllability of the motor vehicle.

According to yet another advantageous embodiment, at least one steering actuator is designed in such a way that said actuator, in the event of the failure thereof, releases a steering movement of the steerable wheel assigned thereto. By means of forces acting on the steerable wheel, said wheel can thereby be passively brought into a steering position which is advantageous for the further driving maneuver, in order to improve the controllability of the motor vehicle. As a result, the situation can be prevented in which the steerable wheel assumes a large steering angle, which results in high transverse forces acting upon the motor vehicle, which forces would make strong counter-steering necessary in order to hold the motor vehicle in a lane, for example.

According to yet another advantageous embodiment, at least one steering actuator is designed in such a way that said actuator, in the event of the failure thereof, dampens a steering movement of the steerable wheel assigned thereto. For example, the steering actuator can be designed in such a way that, in the event of the failure thereof, a steering movement of the steerable wheel assigned thereto is first possible upon an exceeding of a predefined torque limiting value. A phase relay, for example, of the failed steering actuator can be closed for this purpose. This embodiment also improves the controllability of the motor vehicle. Which of the three aforementioned embodiments of the steering actuator is selected depends on the particular wheel suspension implemented in the motor vehicle.

According to yet another advantageous embodiment, the steer-by-wire system comprises at least one coupling device which is signally connected to the steering electronics system and which is configured for mechanically coupling the steerable wheels of a wheel axle to each other in a coupling state of the coupling device and for mechanically decoupling said wheels in a decoupling state of the coupling device, wherein the steering electronics system is configured for controlling the coupling device in such a way that the coupling device is in the decoupling state thereof in the normal operating mode of the steer-by-wire system and is in the coupling state thereof in the emergency operating mode of the steer-by-wire system. In this case, the steering ratio can be more indirect in the emergency operating mode of the steer-by-wire system than in the normal operating mode of the steer-by-wire system, so that the at least one steering actuator that has not failed is not overloaded. The coupling device can comprise at least one locking mechanism which can be controlled by means of the steering electronics and by means of which coupling elements can be mechanically coupled to each other and decoupled from each other, in order to bring about the coupling state or the decoupling state of the coupling device.

In one embodiment, the setting of the deviating steering ratio is done once when emergency operation occurs; that is, the steering ratio which has been—possibly in the way as described above—determined and then set off once on entry of emergency operation, remains constant in this embodiment until the end of the respective emergency operation phase.

The motor vehicle according to the invention comprises a steer-by-wire system according to one of the aforementioned embodiments or any combination of at least two of these embodiments with one another.

The motor vehicle therefore has the advantages mentioned above with respect to the steer-by-wire system. The motor vehicle can be a passenger vehicle or a truck.

According to one advantageous embodiment, the motor vehicle comprises at least one brake module which is signally connected to the steering electronics system and which is configured for controlling at least the wheel brakes assigned to the steerable wheels, wherein the steering electronics system is configured for controlling the brake module in such a way that, in the emergency operating mode of the steer-by-wire system, the brake module limits a maximum braking force, which can be generated by the wheel brake assigned to a steerable wheel having a failed steering actuator, to a predefined limiting value. As a result, the situation is prevented in which the wheel that is no longer steerable by means of the failed steering actuator assumes a large steering angle during a braking procedure or due to forces acting on the wheel, which would adversely affect the driving safety.

According to a method according to the invention for operating a steer-by-wire system of a motor vehicle, wherein the steer-by-wire system comprises at least two wheels which are steerable independently of each other in a normal operating mode of the steer-by-wire system, and at least two steering actuators, each of which is assigned to one of the steerable wheels and is configured for adjusting a steering angle of the particular steerable wheel, it is detected whether one of the steering actuators has failed and, upon detection of a failure of a steering actuator characterizing an emergency operating mode of the steer-by-wire system, the at least one further steering actuator is controlled with a steering ratio having a directness which deviates from a directness of a steering ratio in the normal operating mode.

The method therefore has the advantages mentioned above with respect to the steer-by-wire system. In particular, the steer-by-wire system can be used for carrying out the method. In this regard, advantageous embodiments of the steer-by-wire system can be advantageous embodiments of the method, even if this is not explicitly mentioned in the following.

According to yet another advantageous embodiment, upon detection of the failure of the steering actuator, the at least one further steering actuator is controlled with a more direct steering ratio than in the normal operating mode. This embodiment has the advantages mentioned above with reference to the corresponding embodiments of the steer-by-wire system.

The invention is explained in the following, by way of example, with reference to the attached FIGURE and on the basis of one preferred embodiment, wherein the features presented in the following can depict a refining or advantageous aspect of the invention individually or in various combinations with one another. In the drawing:

BRIEF DESCRIPTION OF THE DRAWING

FIG. 1 shows a schematic representation of one exemplary embodiment of a motor vehicle according to the invention.

DETAILED DESCRIPTION OF INVENTION

FIG. 1 shows a schematic representation of one exemplary embodiment of a motor vehicle 1 according to the invention comprising a steer-by-wire system 2. The motor vehicle 1 comprises two steerable front wheels 3 and 4 and two non-steerable rear wheels 5.

The steer-by-wire system 2 comprises the two front wheels 3 and 4 which are steerable independently of one another in a normal operating mode of the steer-by-wire system 2, and two steering actuators 6 and 7, each of which is assigned to one of the steerable front wheels 3 and 4, respectively, and which are configured for adjusting a steering angle of the particular steerable front wheel 3 and 4, respectively.

The steer-by-wire system 2 also comprises a steering electronics system 8 which is signally connected to the steering actuators 6 and 7 and which is configured for controlling the steering actuators 6 and 7 individually on the basis of steering commands or electrical steering command signals.

The steering electronics system 8 is configured for detecting whether one of the steering actuators 6 or 7 has failed and, upon detection of a failure of a steering actuator 6 or 7 characterizing an emergency operating mode of the steer-by-wire system 2, controls the further steering actuator 7 or 6 with a steering ratio having a directness which deviates from a directness of a steering ratio in the normal operating mode. In particular, the steering electronics system 8 can be configured in such a way that, upon detection of the failure of the steering actuator 6 or 7, said system controls the further steering actuator 7 or 6 with a more direct steering ratio than in the normal operating mode.

This adjustment of the steering ratio can preferably take place once when emergency operation occurs; that is to say, the correspondingly adapted steering ratio would then continue to be valid until the end of the emergency operating phase.

At least one steering actuator 6 or 7 can be designed in such a way that said actuator, upon the failure thereof, blocks a steering movement of the steerable wheel 3 or 4, respectively, assigned thereto. Alternatively, at least one steering actuator 6 or 7 can be designed in such a way that said actuator, upon the failure thereof, releases a steering movement of the steerable wheel 3 or 4, respectively, assigned thereto. Alternatively, at least one steering actuator 6 or 7 can be designed in such a way that said actuator, upon the failure thereof, dampens a steering movement of the steerable wheel 3 or 4, respectively, assigned thereto.

The steer-by-wire system 2 can optionally comprise a coupling device 9 which is signally connected to the steering electronics system 8 for and which is configured for mechanically coupling the steerable wheels 3 and 4 of the front wheel axle to each other in a coupling state of the coupling device 9 and for mechanically decoupling said wheels in a decoupling state of the coupling device 9. The steering electronics system 8 can be configured, in this case, for controlling the coupling device 9 in such a way that the coupling device 9 is in the decoupling state thereof in the normal operating mode of the steer-by-wire system 2 and is in the coupling state thereof in the emergency operating mode of the steer-by-wire system 2.

The motor vehicle 1 also comprises a brake module 10 which is signally connected to the steering electronics system 8 and which is configured for controlling wheel brakes 11 assigned to the wheels 3, 4 and 5. The steering electronics system 8 is configured for controlling the brake module 10 in such a way that, in the emergency operating mode of the steer-by-wire system 2, the brake module 10 limits a maximum braking force, which can be generated by the wheel brake 11 assigned to a steerable wheel 3 or 4 having a failed steering actuator 6 or 7, respectively, to a predefined limiting value.

LIST OF REFERENCE NUMBERS

1 Motor vehicle
2 Steer-by-wire system
3 Steerable wheel
4 Steerable wheel
5 Non-steerable rear wheel
6 Steering actuator
7 Steering actuator
8 Steering electronics system
9 Coupling device
10 Brake module
11 Wheel brake

The invention claimed is:

1. A steer-by-wire system for a motor vehicle, comprising:
at least two wheels which are steerable independently of one another in a normal operating mode of the steer-by-wire system,
at least two steering actuators, each of which is assigned to one of the steerable wheels and is configured for adjusting a steering angle of a particular steerable wheel, and
at least one steering electronics system which is signally connected to the steering actuators and which is configured for controlling the steering actuators individually on the basis of steering commands, wherein, upon detection of a failure of a steering actuator of the at least two steering actuators, thereby indicating an emergency operating mode of the steer-by-wire system, the at least one steering electronics system selects a specific steering ratio from one or multiple steering ratios for each failure scenario and uses said selected steering ratio for controlling at least one steering actuator of the at least two steering actuators that has not failed, said selected steering ratio having a directness that deviates from a directness of a steering ratio in the normal operating mode.

2. The steer-by-wire system as claimed in claim 1, wherein upon detection of the failure of the steering actuator, said at least one steering electronics system controls the at least one steering actuator that has not failed with a more direct steering ratio than in the normal operating mode.

3. The steer-by-wire system as claimed in claim 1, wherein the steering actuator that has failed blocks a steering movement of a steerable wheel assigned thereto.

4. The steer-by-wire system as claimed in claim 1, wherein the steering actuator that has failed releases a steering movement of a steerable wheel assigned thereto.

5. The steer-by-wire system as claimed in claim 1, wherein the steering actuator that has failed dampens a steering movement of a steerable wheel assigned thereto.

6. The steer-by-wire system as claimed in claim 1, further comprising at least one coupling device which is signally connected to the at least one steering electronics system and which is configured for mechanically coupling the steerable wheels of a wheel axle to each other in a coupling state of the coupling device and for mechanically decoupling said wheels in a decoupling state of the coupling device, wherein the at least one steering electronics system is configured for controlling the coupling device so that the coupling device is in the decoupling state in the normal operating mode of the steer-by-wire system and is in the coupling state in the emergency operating mode of the steer-by-wire system.

7. The steer-by-wire system as claimed in claim 1, wherein a specific steering ratio for each failure scenario is stored in the at least one steering electronics system or in a memory unit contained therein.

8. The steer-by-wire system as claimed in claim 1, wherein said system has no torque sensor.

9. A motor vehicle comprising a steer-by-wire system as claimed in claim 1.

10. The motor vehicle as claimed in claim 9, further comprising at least one brake module which is signally connected to the at least one steering electronics system and which is configured for controlling at least the wheel brakes assigned to the steerable wheels, wherein the at least one steering electronics system is configured for controlling the brake module so that, in the emergency operating mode of the steer-by-wire system, the brake module limits a maximum braking force, which is generated by the wheel brake assigned to a steerable wheel having a failed steering actuator, to a predefined limiting value.

11. A method for operating a steer-by-wire system of a motor vehicle, wherein the steer-by-wire system comprises at least two wheels which are steerable independently of each other in a normal operating mode of the steer-by-wire system, and at least two steering actuators, each of which is assigned to one of the steerable wheels and is configured for adjusting a steering angle of a particular steerable wheel, said method comprising:

detecting a failure of a steering actuator of the at least two steering actuators, thereby indicating an emergency operating mode of the steer-by-wire system; and at least one steering electronics system selecting a specific steering ratio from one or multiple steering ratios for each failure scenario and using said selected steering ratio for controlling at least one steering actuator of the at least two steering actuators that has not failed, wherein said selected steering ratio has a directness that deviates from a directness of a steering ratio in the normal operating mode.

12. The method as claimed in claim 11, wherein upon detection of the failure of the steering actuator, the at least one steering actuator that has not failed is controlled with a more direct steering ratio than in the normal operating mode.

13. The method as claimed in claim 11, wherein at least one steering actuator of the at least two steering actuators, in the event of the failure thereof, blocks a steering movement of a steerable wheel assigned thereto.

14. The method as claimed in claim 11, wherein at least one steering actuator of the at least two steering actuators, in the event of the failure thereof, releases a steering movement of a steerable wheel assigned thereto.

15. The method as claimed in claim 11, wherein at least one steering actuator of the at least two steering actuators, in the event of the failure thereof, dampens a steering movement of a steerable wheel assigned thereto.

16. The method as claimed in claim 11, wherein a specific steering ratio for each failure scenario is stored in the at least one steering electronics system or in a memory unit contained therein, and is selected depending on the particular actuator which has failed.

* * * * *